(12) United States Patent
Peletz

(10) Patent No.: US 12,445,356 B1
(45) Date of Patent: Oct. 14, 2025

(54) AUTOMATED CONTAINER ORCHESTRATION IN A CLOUD-BASED NETWORK

(71) Applicant: DISH Wireless L.L.C., Englewood, CO (US)

(72) Inventor: Brian Peletz, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/631,997

(22) Filed: Apr. 10, 2024

(51) Int. Cl.
*H04L 41/0895* (2022.01)
*H04L 41/0806* (2022.01)
*H04L 47/70* (2022.01)

(52) U.S. Cl.
CPC ...... *H04L 41/0895* (2022.05); *H04L 41/0806* (2013.01); *H04L 47/70* (2013.01)

(58) Field of Classification Search
None
See application file for complete search history.

(56) References Cited

U.S. PATENT DOCUMENTS

| | | | |
|---|---|---|---|
| 2017/0223115 A1* | 8/2017 | Childs | G06F 9/50 |
| 2020/0241926 A1* | 7/2020 | Guim Bernat | G06F 9/5044 |
| 2022/0035650 A1 | 2/2022 | Banerjee et al. | |
| 2022/0066910 A1* | 3/2022 | Malleni | G06F 11/3688 |
| 2023/0035600 A1 | 2/2023 | Holzman et al. | |
| 2023/0325166 A1 | 10/2023 | Cao et al. | |
| 2024/0111734 A1* | 4/2024 | Agrawal | G06F 16/211 |
| 2025/0070906 A1* | 2/2025 | Zhou | H04J 14/0212 |

OTHER PUBLICATIONS

"About Nephio" retrieved on Feb. 14, 2024 from <https://nephio.org/about/> (7 pages).
"Overview of Nephio" retrieved on Feb. 14, 2024 from <https://wiki.nephio.org/display/HOME/Overview+of+Nephio> (4 pages).
PCT International Search Report for International Application No. PCT/US2025/023858 mailed Jul. 2, 2025 (5 pages).
PCT Written Opinion for International Application No. PCT/US2025/023858 mailed Jul. 2, 2025 (6 pages).
Kaur et al. "A review on Virtualized Infrastructure Managers with management and orchestration features in NFV Architecture," Computer Networks, Elsevier, v. 217, dated Aug. 17, 2022 (32 pages).

* cited by examiner

*Primary Examiner* — Quang N Nguyen
(74) *Attorney, Agent, or Firm* — KW Law, LLP

(57) ABSTRACT

An example process includes writing, by a global controller in a first computing environment, a first job and a second job to a global database to implement a template of a network function in a first cloud environment and a second cloud environment. The global controller orchestrates a first container cluster. A first macro controller in the first cloud environment executes the first job from the global database to instantiate the network function in the first cloud environment. The first macro controller orchestrates a second container cluster that is a member of the first container cluster. A second macro controller in the second cloud environment executes the second job from the global database to instantiate the network function in the first cloud environment. The second macro controller orchestrates a third container cluster that is a member of the first container cluster.

17 Claims, 6 Drawing Sheets

AUTOMATED CONTAINER ORCHESTRATION IN A CLOUD-BASED NETWORK

TECHNICAL FIELD

The following discussion generally relates to data and telephone networks, and in particular to automated container orchestration in a cloud-based network.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidths than were previously available, so it is likely that the widespread deployment of 5G networks could radically expand the number of services available to customers. This expansion will likely result in an increased need for scaling.

The growing bandwidth and capacity of data and telephone networks relies on increasing software and hardware resources to support such networks. Hardware radio units and antennas are typically fixed in permanent or semi-permanent locations. In order to expand the area served by radio units, more units can be deployed or existing units can be redeployed. Either way, hardware must be physically present in the desired location.

The same is true for cloud-based hardware data and telephone infrastructure. The number of and location of data centers can limit expansion or performance of a cloud-based network. Virtual infrastructure can be provisioned in the physical locations of data centers supporting the network. However, scaling relies on structured scaling tools that are unavailable in current cloud-based networks. Scaling tools currently available can impede innovation and implementation of change due to unwieldy components, general complexity, and lack of tooling.

SUMMARY

Systems, methods, devices, and articles of the present disclosure can automate containerized infrastructure across multiple cloud environments. Various embodiments can comprise a multi-cloud platform that implements a network function of a telecommunication network, the multi-cloud platform comprising a processor in communication with a non-transitory memory configured to store instructions that, when executed by the processor, cause the multi-cloud platform to perform operations. Some embodiments include a non-transitory computer-readable medium having instructions stored thereon that, when executed by a computer-based system, cause the computer-based system to perform operations.

An example process includes writing, by a global controller in a first computing environment, a first job and a second job to a global database to implement a template of a network function in a first cloud environment and a second cloud environment. The global controller orchestrates a first container cluster. A first macro controller in the first cloud environment executes the first job from the global database to instantiate the network function in the first cloud environment. The first macro controller orchestrates a second container cluster that is a member of the first container cluster. A second macro controller in the second cloud environment executes the second job from the global database to instantiate the network function in the first cloud environment. The second macro controller orchestrates a third container cluster that is a member of the first container cluster.

In various embodiments, executing the first job comprises the steps of writing, by the first macro controller, a third job for a network controller to a macro database in the first cloud environment; writing, by the first macro controller, a fourth job for an infrastructure controller to the macro database in the first cloud environment; and writing, by the first macro controller, a fifth job for an application controller to the macro database in the first cloud environment. The network controller may execute the third job to allocate network resources in the first cloud environment. The infrastructure controller can execute the fourth job to deploy the second container cluster using the network resources. The application controller can execute the fifth job to instantiate the network function on the second container cluster using the network resources. The template can include a memory specification, a processing specification, a network specification, and a security specification. The example process can further include generating, by the first macro controller, a targeted template using a library specific to the first cloud environment. The targeted template implements the memory specification, the processing specification, the network specification, and the security specification using commands native to the first cloud environment. A portal can receive a selected configuration for a guest network and can generate the template of the network function to implement the selected configuration. The process can include identifying a first data center of the first cloud environment to host the network function in response to a geographic location of the selected configuration.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

Figure 1:
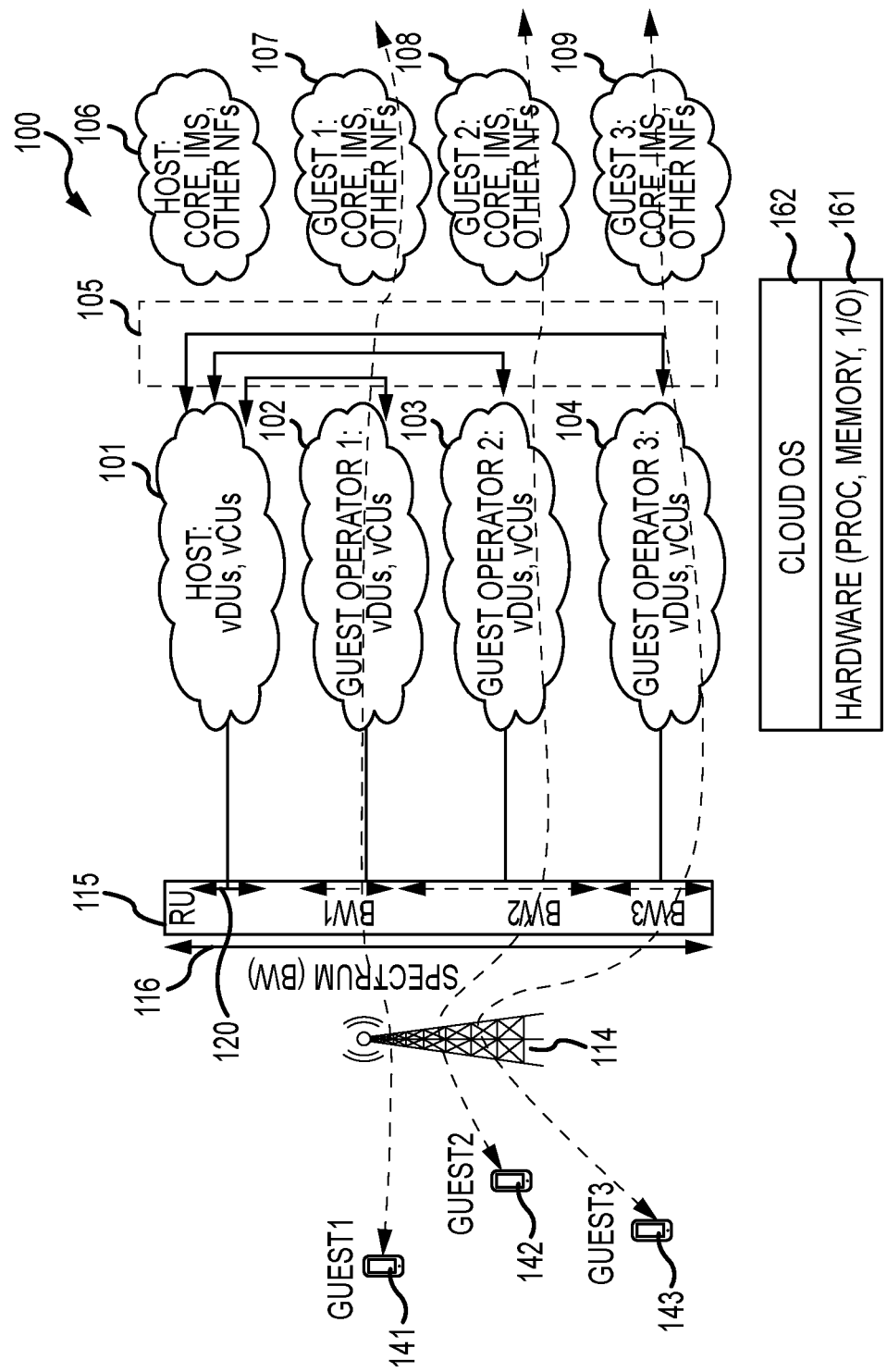
FIG. 1 illustrates an example of a 5G data and telephone network using cloud-based virtualization, in accordance with various embodiments.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

The present disclosure relates to container-based implementations of data and telephone networks. Systems, processes, and devices (collectively, the System) of the present disclosure can implement a highly-available platform capable of accepting templated input in an understood format. The templated input can be interpreted and translated by a workflow engine to deterministically deliver an application and the necessary network and infrastructure requirements to support it on any platform capable of programmatic configuration. The System can support implementation of compatible and nearly identical infrastructure on different underlying platforms. For example, container-based implementations of a network function can be implemented on the System in AWS®, Azure®, Google cloud platform (GCP®), and other cloud-computing platforms. Flexibility to implement on different cloud platforms can open access to additional data centers and hardware infrastructure, enable redundancy, and improve service speeds and performance in a data and telephone network.

Container management systems can recursively call container management systems on various cloud-computing networks. The recursively called container management systems on various cloud-computing platforms can recursively call container management systems to implement templated network functions of the data and telephone network. As used herein, the term recursive and similar terms are used to describe the relationship of a container management system launching another container management system. For example, a Kubernetes® container management system can recursively launch another Kubernetes container management system.

Systems and processes of the present disclosure result in nested or layered containers implementing infrastructure of a data and telephone network. The platform-centric cluster can address localization needs such as platform credentialing and close proximity execution. Behaviors of the platform centric clusters are consistent across all deployed environments, resulting in consistent and well understood processes.

Templates can be generated for different deployment environments to implement consistent container clusters whether created on AWS, Azure, GCP, or other cloud-computing platforms. Composing infrastructure into pod-like units enables the replication of Kubernetes to scale the environment and templating infrastructure architecture patterns. Like-for-like abstraction tends to enable creation and use of higher order templates for consistent modeling and scaling across any platforms as macro services. Consistent input parameters to high order templates allow execution against any integrated platform without having to focus on platform specific language requirements for provisioning. The System can thus have a high survivability rate, in many instances higher than the infrastructure it manages. The System is easily replaceable and replicable, which tends to improve resilience. By distributing the same functionality across multiple cloud-platforms and underlying infrastructure, the fault domain is limited to the scope of the faulted segment and tends to prevent mass outage of the overall platform.

The System can leverage recursive workflows to scale capacity and capability down to the atomic unit where differentiation is resolved. Higher order behaviors become abstracted and consistent by using a common standardized design. Low order components will typically be platform specific, but by encapsulating the primitive building blocks into higher order branded structures with consistent input, the higher order components can be interchangeable regardless of target platform. This structure allows the consumption of higher order components to be leveraged for rapid design with the ability to be executed against any platform provider and remain successful. Because the development cycle and consumption of the resources is consistent across all platforms, the ability to develop for and support the system is simplified due to the repetitive nature of the complex system.

With reference now to FIG. 1, an example of a 5G data and telephone network 100 (i.e., a cellular communication system) built on a cloud-based environment is shown, in accordance with various embodiments. Cellular communication system 100 is implemented on cloud-based infrastructure to facilitate dynamic network adaptation. In some examples, cloud-based implementations can use container-based virtualization such as those made popular by the commercially available container orchestration products available by the Linux Foundation under the tradename Kubernetes. Cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external MVNOs, or converged operators.

In the example of FIG. 1, each RU 115 communicates with UE 141, 142, 143 operating within a geographic area using one or more antennas 114 capable of transmitting and receiving messages within an assigned spectrum 116 of electromagnetic bandwidth. In various embodiments, guest networks 102, 103, 104 interact with a provisioning plane 105 to obtain desired spectrum across one or more of the RUs 115 operated by the host 101. Provisioning plane 105 allows guest network operators to obtain or change their assigned bandwidths on different RUs 115 on an on-demand and dynamic basis.

The Open RAN (O-RAN) standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QOS) routing and the like. The CU also supports packet data convergence protocol (PDCP), service data adaptation protocol (SDAP), and radio resource controller (RRC) functions. The RU, DU, and CU functions are described in more detail in the Open RAN standards, as updated from time to time, and may be modified as desired to implement the various functions and features described herein. In the example of FIG. 1, host network 101 maintains one or more DUs and CUs (i.e., network functions) as part of its own network. The DU communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the Amazon® Web Service (AWS) platform offered by Amazon Inc., although other embodiments could use other cloud platforms or any type of conventional physical computing hardware 161, as desired. For example, 5G data and telephone network 100 could also run on ServerSpace, Microsoft Azure, Google Cloud Platform, IBM Cloud Services, Kamatera, VMware, or any other suitable cloud service. Various embodiments can implement container-based virtualization within cloud-infrastructure. In one example, systems of the present disclosure can implement Kubernetes on AWS.

As illustrated in the example of FIG. 1, 5G data and telephone network 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources. Instances of virtual DUs and virtual CUs may be associated with user accounts and various container-based systems that create or access executables.

Guest networks 102, 103, 104 operated by guest operators can manage their own networks using allocated portions of spectrum 116 handled by one or more of the RUs 115 associated with the host network 101. The guest networks 102, 103, 104 communicate with one or more UEs 141-143 using allocated bandwidth on the host's RUs 115. Host network 101 may include one or more virtual DUs and CUs, as well as other network services 106. Guest networks 102, 103, 104 may similarly include one or more virtual DUs and CUs, as well as other network services 107, 108, 109 variously associated with user accounts and group permissions, as desired. Generally, some guest operators will instantiate their own 5G virtualized network functions (e.g., CMS, vCUs, vDUs, etc.) using cloud-based resources, as noted above. Various embodiments may instantiate network services using templates and container orchestration to implement network functions in a scalable and sustainable manner.

Each RU 115 is typically associated with a different wireless cell that provides wireless data communications to user devices 141-143. RUs 115 may be implemented with radios, filters, amplifiers, and other telecommunications hardware to transmit digital data streams via one or more antennas 114. Generally, RU hardware includes one or more processors, non-transitory data storage (e.g., a hard drive or solid-state memory), and appropriate interfaces to perform the various functions described herein. RUs can be physically located on-site with the transmitter/antenna 114, as appropriate. Cloud-based data and telephone networks can make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of RUs 115 that can each be individually configured to provide highly configurable geographic coverage for a host or guest network, if desired. The physical RUs communicate with virtualized network nodes including DUs and CUs, which can be commissioned in containers using templates in response to changing demand.

Figure 2:
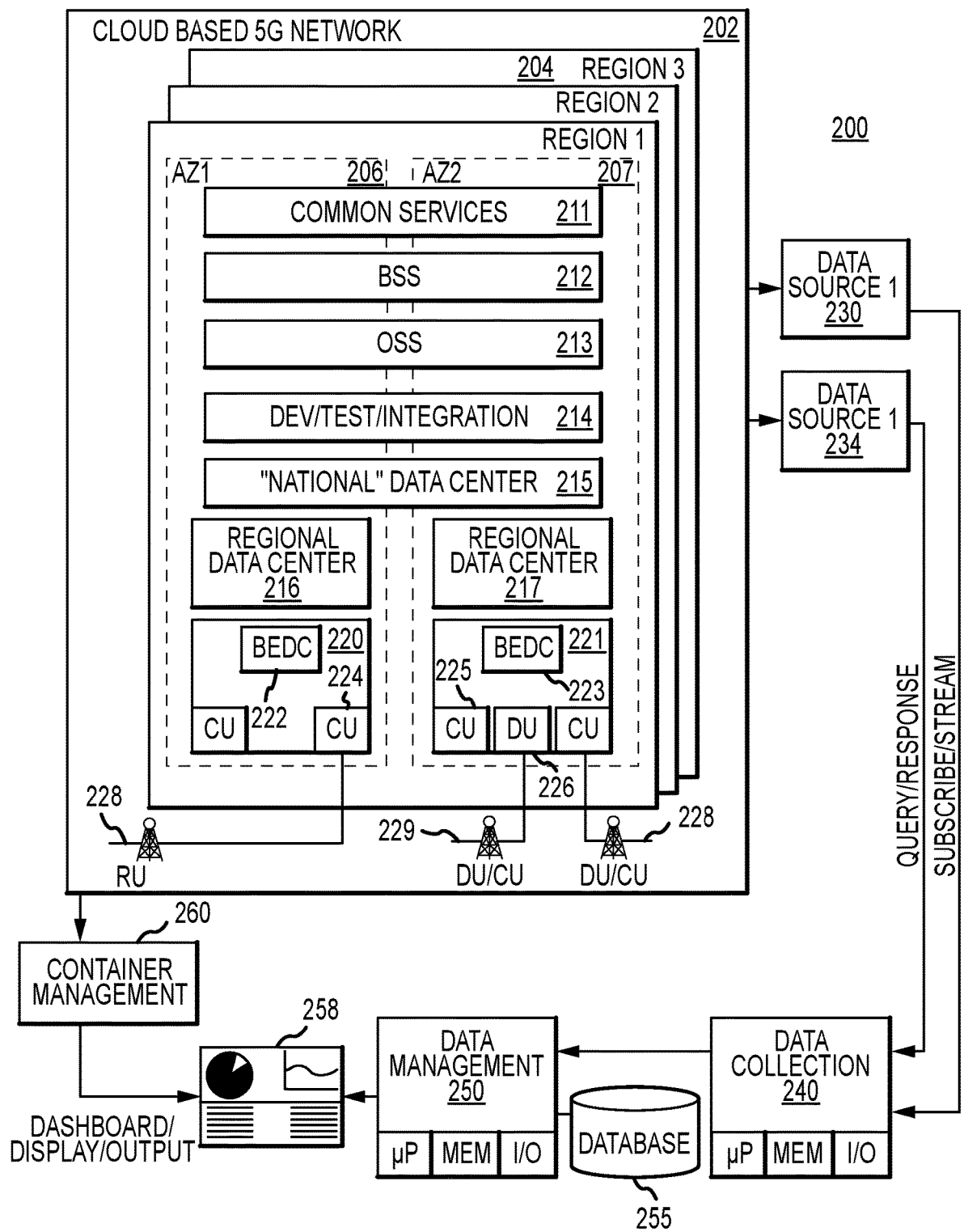
FIG. 2 illustrates an example of cloud infrastructure supporting a 5G data and telephone network, in accordance with various embodiments.

With reference to FIG. 2, a 5G wireless network 202 is implemented using cloud-based computing resources. In the example of FIG. 2, 5G wireless network 202 encompasses data processing services supporting multiple regions 204, each having one or more availability zones (AZs) 206, 207 that each act as a separate data center with its own redundant power, network connectivity, and other resources, as desired. In some implementations, the various AZs operating within the same region will provide redundancy in the event a neighboring AZ fails or is overloaded. Container-based functions can by dynamically provisioned and deprovisioned to support data and telephone network 100 of (FIG. 1).

The example of FIG. 2 illustrates three regions, with region 204 having two AZs 206, 207, although other embodiments could include any number of regions and AZs providing any number of services and resources. The regions and availability zones are often described herein with reference to geographic locations, but in practice the regions and availability zones could be equivalently organized based upon customer density, user density, expected network demand, availability of electric power or bandwidth, or any other factors. As noted above, it will still be necessary to deploy radio units (RUs) within broadcast range of end users. But by implementing the other functions of the network using virtualized hardware operating within a cloud-type architecture, geographic restrictions on 5G wireless network 202 can be reduced. This can provide substantial efficiencies in deployment and expansion of 5G wireless network 202, while also allowing for more efficient use of computing resources, data storage, and electric power.

In example of FIG. 2, a network operator maintains ownership of one or more RUs 228 associated with a wireless network cell. Each RU 228, 229 communicates with UE operating within a geographic area using one or more antennas. In the example illustrated in FIG. 2, common services (e.g., billing, guest network allocation, etc.) can be performed in a shared service 211 across the available AZs 206, 207. Typically, these shared services will be implemented within a common virtual private cloud (VPC) 220, 221 operating within the cloud environment. Similarly, shared VPC systems can support business support system (BSS) 212, operational support services (OSS) 213, development/test/integration features 214, and/or the like across the entire region. A region wide data center (identified as a "national" data center 215 in FIG. 2) could be implemented in a shared VPC across AZs 206, 207, if desired, with subordinate data centers (e.g., "regional" data centers 216, 217) being separated into different VPCs for each of the AZs 206, 207. Additional levels of data centers can be established, if desired, or the different data center functions can be differently organized in any number of equivalent embodiments. In various embodiments, VPCs can be implemented using templates in conjunction with container orchestration to provision virtualized assets.

National data centers 215 are typically equipped to host resource-intensive services such as 5G core services. In the AWS example, a national data center 215 is currently available in four regions in the United States (Oregon, Ohio, California, and Virginia). In an Azure-based example, national data centers 215 are currently available in Arizona, Washington, California, Wyoming, Texas, Illinois, Georgia, Virginia, and Iowa. While U.S. states are used as example locations, cloud systems in any nation or region could be equivalently used to implement the templating and container-based techniques described herein.

In the example of FIG. 2, each AZ 206, 207 includes one or more breakout edge data centers (BEDCs) each supporting a local zone (LZ) with one or more RUs. The BEDCs are ideally organized for very low latency to provide the best possible throughput and low latency to the various user equipment operating within the local zone. BEDCs 222, 223 will typically implement one or more CUs in accordance with the O-RAN specifications. BEDCs may also implement user plane functions that handle user data sessions for gaming, streaming, and other network services, as desired. Again, any number of BEDCs and other data centers may be implemented using any number of different or shared VPCs in the cloud environment.

As noted above, each of the various network components shown in FIG. 2 is typically implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, or the like.

The various components of 5G wireless network 202 can be implemented using VPCs or other virtual hardware components. Each of these VPCs will typically produce data during operation that indicates status, performance, capacity, or any number of other parameters. It is generally desired to monitor the status of 5G wireless network 202. One way to track network status is to process the large amount of data produced by the various modules and components to generate dashboards or other reports that can be viewed by an operator. Operating data can also be used to adjust the configuration or operation of the network. For example, network functions can be implemented in data centers by provisioning the functions using templates and container orchestration.

In various embodiments that make use of a data pipeline, one or more data sources 230, 234 can be provided to obtain raw data from one or more of the components of 5G wireless network 202. Data sources 230, 234 may receive data as part of a data stream, if desired. Other data sources 230, 234 may simply receive and maintain log data or the like from one or more associated components, as appropriate. Any number of streaming or query-based data sources 230, 234 may be deployed within system 200 as desired.

In the example shown in FIG. 2, data source 230 may be configured in accordance with the KAFKA software tool available from the Apache Software Foundation. The software may be installed to execute on any sort of hardware, including a conventional computer server with a processor, memory, and input/output interfaces to the appropriate components of 5G wireless network 202. Equivalently, data source 230 may be implemented using a virtual private cloud or virtual server system as part of a cloud provider, as desired.

The streaming data source 230 will typically be configured to receive real-time data (or near real time data, accounting for some delays inherent in data processing, communications, and the like) from one or more components of 5G wireless network 202. Streaming data may be particularly useful for network components that generate substantial amounts of real-time data (e.g., performance measurements, etc.). Data source 230 will be configured to receive the data stream from the monitored component, typically as a consumer process executed by data source 230. Other embodiments may use other tools, and/or may be configured in any other manner.

If desired, multiple components of 5G wireless network 202 could supply streaming data to a common data source 230. DU and CU modules of 5G wireless network 202, in particular, provide substantial amounts of real-time data that can be very efficiently pipelined through a combined streaming data source 230, as appropriate.

In the example of FIG. 2, data source 234 is shown as a query-based source that collects data from one or more components of 5G wireless network 202. Generally speaking, data handled by query-based sources tends to be less reliant upon real-time delivery for status updates, or the like. Log data, fault metrics, performance metrics, and other types of time-series data may be particularly well-suited for query-type collection.

In one embodiment, query-based data source 234 is implemented for a pull-based data collection model using HTTP-type messaging. Software is configured to run on a computer server (implemented with conventional hardware and/or cloud-based resources, as desired) that queries the monitored components according to any desired time schedule to receive data. The data received in response to the queries may be locally cached in any sort of non-transitory memory (e.g., solid state memory, magnetic or optical memory, cloud-based sources, and/or the like) for subsequent retrieval and processing, as desired. Query-based data source 234 may be particularly useful in tracking data produced by the various DUs, MTAs, and other components of the network that produce substantial amounts of log data. Typically, each component is configured to write its output/log data to the data source 234, as desired.

Although FIG. 2 illustrates one streaming data source 230 and one query-based data source 234, in practice, any number of different sources could be used to monitor any number of different components of 5G wireless network 202. Some components may provide streaming data and query-based data to multiple data sources, if desired.

A data collection system 240 suitably communicates with one or more data sources 230, 234 to obtain streaming or query-based data. In various embodiments, data collection system 240 subscribes to one or more data feeds or other streaming services associated with data sources 230, 234. Data collection system 240 may also be configured to place queries on query-based data sources 234, as desired. Data collection system 240 typically receives the requested and/or subscribed data, formats and/or filters the received data, and forwards the collected data to a data management system 250 for storage, reporting, and/or any other further processing as desired. In various embodiments, the data collection system 240 receives data in JSON or similar format, appends source and/or service location information as tags, or the like, and pushes the tagged data to the data management system 250 (using, e.g., HTTP structures, or the like). Generally, the data collection system will be configurable to specify batch sizes, delivery times, and/or other parameters for obtaining query-based data and/or for pushing collected data to the data management system 250. Some embodiments may also filter the received data as desired to remove unwanted or unnecessary data that would otherwise consume excess storage in data management system 250. Other embodiments may perform additional monitoring, as needed.

Data management system 250 is any data processing system capable of receiving the data from data collection system 240 and presenting the collected data for further use. In various embodiments, data management system 250 is a computer server implemented with conventional or virtual cloud-based hardware executing software for managing collected data. In various embodiments, data management system 250 stores received data in a database 255 for later retrieval, as desired. Data management system 250 may also provide reports to human and/or automated reviewers. Output 258 can be displayed visually in dashboard form, for example. Output 258 can be in a machine-readable form such as a tagged data store, a JSON file, or other structured or unstructured data formats. Output 258 can be used to assess routing performance for calls and other time sensitive communications. Output 258 can indicate that existing resources for a network function are low and additional container-based resources should be provisioned.

The example illustrated in FIG. 2 shows data sources 230, 234 as obtaining aggregated data from components of 5G wireless network 202. This points out the relationships between the sources of data, data collection system 240, and data management system 250. In a practical implementation, however, data collection system 240 may be equivalently configured to subscribe to live data streams or to directly poll components of 5G wireless network 202, without the need for separate data aggregation systems 230, 234, as desired.

In another equivalent embodiment, the functionality of data sources 230, 234 is designed into the components of the 5G wireless network 202 themselves, thereby obviating the need for separate aggregation. One or more components of 5G wireless network 202 may be configured to supply a data stream directly to data collection system 240, for example. Similarly, data collection system 240 could posit queries directly to components of 5G wireless network 202, if desired, without the need for intervening processing modules. Processed data is provided for delivery to the data management system 250 described above. In various embodiments, output feature 258 provides data to the data management system 250 using HTTP structures (e.g., HTTP "PUT" features), JSON, unstructured data, or the like. Other embodiments could implement the various functions and components described herein in any number of equivalent arrangements.

In operation, then, a data management system 250 obtains streaming or query-based data from one or more components of a 5G wireless network operating within a cloud-based computing environment. The data is obtained directly from the component, or via intervening data source systems 230, 234 that aggregate data from multiple data sources within 5G wireless network 202. Collected data is tagged and filtered as desired, and the resulting data is delivered to a data management system for storage, reporting, and/or other actions as appropriate. Other embodiments may include other processing modules in addition to those illustrated, and/or may provide the various features and functions described herein using different (but equivalent) arrangements of processing modules and features, as desired.

Container management system 260 can run on cloud-based infrastructure to support network 100. Further efficiencies can be realized through the use of a container orchestration system such as Kubernetes software or the like. An orchestration system can be used to automate software deployment, scaling, and network management. While Kubernetes is one example of container orchestration software suitable for use in container management system 260, software equivalent embodiments could use other management platforms as desired. Continuing the AWS example, AWS cloud platform may offer Kubernetes-based infrastructure to provide infrastructure-as-a-service (IaaS) functionality. Generally speaking, Kubernetes software (and the like) provide primitive structures that can collectively provide mechanisms to deploy, maintain, and scale cloud-based applications based upon one or more processors, memory and/or other resources. Kubernetes allows the hardware of a data processing server to be abstracted and thereby implemented using cloud-based services such as AWS, VMware, and/or the like. Templates can be used in a recursive or semi-recursive manner to launch containers in some embodiments. Templates can be tiered or otherwise organized in a hierarchy to implement the various features of network 100.

Figure 3:
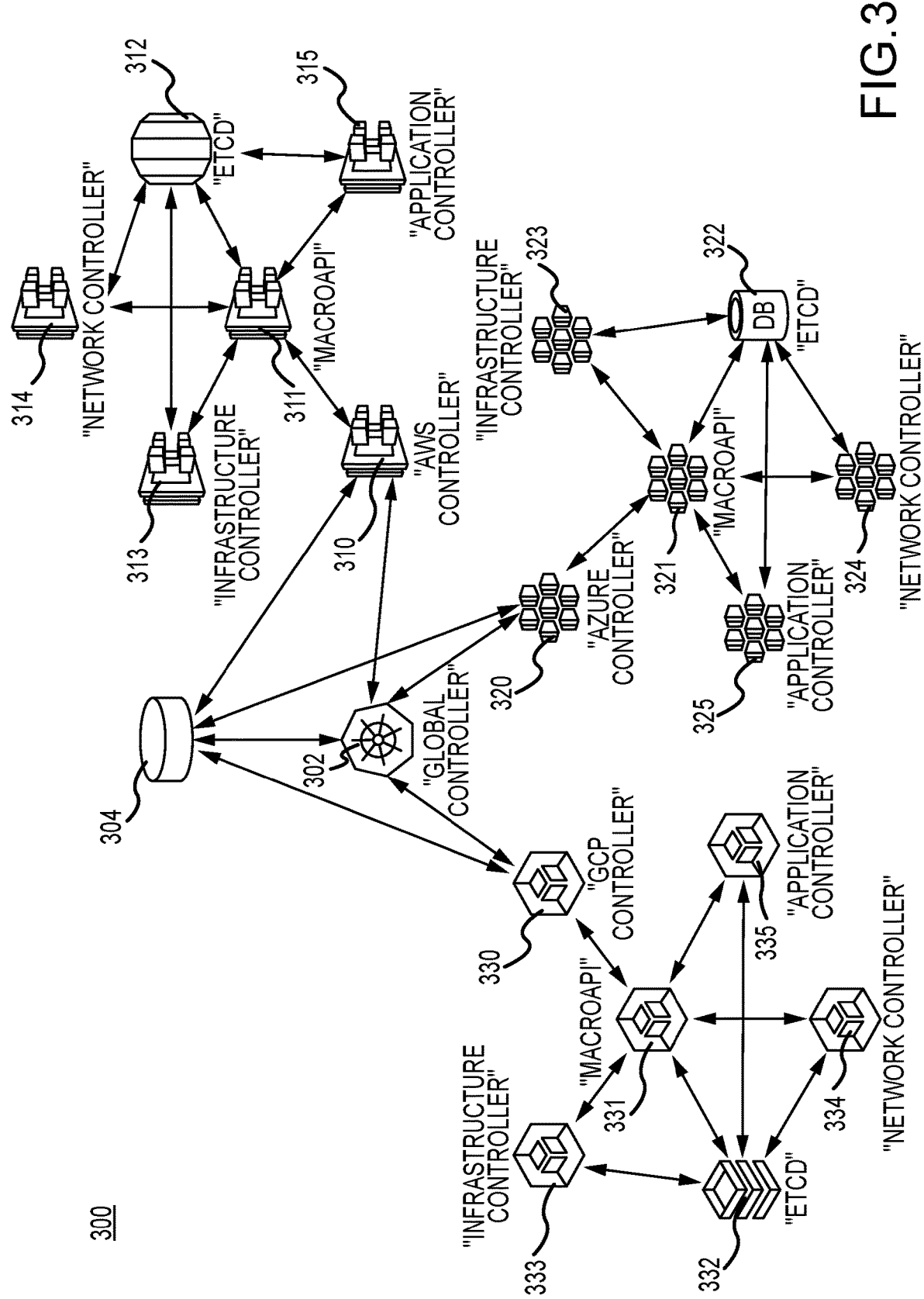
FIG. 3 illustrates an example system for implementing network services of a 5G data and telephone network in multi-cloud environments, in accordance with various embodiments.

Referring now to FIG. 3, an example system 300 is shown for container orchestration, in accordance with various embodiments. In the example of FIG. 3, global controller 302 is in communication with global database 304. Global controller 302 can invoke container management functions in various cloud-based environments through local controllers. For example, global controller 302 may invoke container management functions in AWS through AWS macro controller 310, in Azure through azure macro controller 320, or in the Google cloud platform using GCP macro controller 330. While AWS, Azure, and GCP are used as examples in FIG. 3, any the System of the present disclosure can also be implemented using VMWare Cloud, Oracle Cloud, IBM Cloud, Kamatera, Alibaba Cloud, Cloudways, Linode, other cloud environments or any combination thereof. Global database 304 can store top-level configuration data for system 300. The controller can use configuration data stored in global database 304 to call or create other elements of system 300 in various cloud environments.

In various embodiments, local container controllers in cloud-platforms can be invoked using templates. Templates can include resource plans, access plans, application plans, executables, templates, or other information and resources for use in provisioning containers in a cloud-platform. A template for a network function in data and telephone network 100 can comprise platform-specific commands, data structures, and function calls used to implement the network function in the particular cloud platform. The same network function can be implemented in different cloud environments using the template corresponding to the selected cloud environment. The platform-agnostic approach to implementing network functions enables cloud-based infrastructure to run at geographically distinct data centers supporting different cloud environments.

In the example of FIG. 3, global controller 302 may comprise a Kubernetes controller or other controller compatible with container-based computing systems. Global controller 302 can run in a third-party cloud, in a private cloud, or on local computing hardware running traditional operating systems. Macro controller 310 (e.g., the AWS controller) may become a member of global controller 302, macro controller 320 (e.g., the Azure controller) may become a member of global controller 302, and macro controller 330 (e.g., the GCP controller) may become a member of global controller 302. In that regard, computing nodes in different cloud environments can become members of the same higher-level computing cluster. Global controller 302 can communicate with, call, invoke, or control macro controllers using an application programming interface (API) in some examples.

In various embodiments, global controller 302 can interface with AWS controller 310 using an API and/or by writing stateful data to global database 304. Global database 304 can contain tasks for execution in the AWS cloud environment by macro controller 310 to create network functions in the AWS cloud environment. Macro controller 310 reads an input template to identify the network space parameters for network controller 314. Templates can be identified by reference or can be passed as an input to macro controller 310. Templates can be stored in global database 304 for access by macro controller 310. Macro controller 310 can also request infrastructure space for network functions in the form of container clusters and applications written into those clusters in the application space.

Continuing the AWS example, macro controller 310 can create jobs and write jobs into macro database 312 (e.g., EC2 or another AWS-specific data store) for execution by various controllers using macro API 311 or otherwise interfacing with macro database 312. The jobs written to the AWS database can include jobs to prepare network resources to support operation of a network function. Network controller 314 can process network configuration settings included in templates. The template can be read and processed by macro controller 320, which then writes jobs for network controller 314 to macro database 312. Templates can thus be used to create network infrastructure in a container-based environment. For example, network controller 314 can launch tasks that process network settings from templates to create subnets, routing tables, virtual private clouds, virtualized routing infrastructure such as routers or switches, or other network infrastructure. Network controller 314 can store stateful data into macro database 312. Data written to macro database can be read, written, or otherwise used by other controllers in the same cloud environment.

Further continuing the AWS example, macro controller 310 can create jobs and write jobs into macro database 312 (e.g., EC2 or another AWS-specific data store) for execution by infrastructure controller to provision computing resources for a network function. Infrastructure controller 313 processes jobs from macro database 312 to create virtualized infrastructure in some examples. In a Kubernetes-based example, infrastructure controller 313 can be a Kubernetes cluster that builds a Kubernetes cluster, which will support operation of the templated network function. The Kubernetes clusters provisioned by infrastructure controller 313 can be specific to network functions supported by the clusters and can be implemented using cloud-specific interfaces (e.g., Amazon EKS for AWS, Azure Kubernetes Service (AKS) for Azure, or Google Kubernetes Engine (GKE) for GCP). For example, the clusters may include memory resources, processing resources, security controls, user accounts, or other infrastructure. Infrastructure controller 313 may write stateful data to macro database 312 using macro API 311 or by directly interfacing with macro database 312. Other controllers may interact with the stateful data to implement the templated network function.

In the AWS example, macro controller 310 can create jobs and write jobs into macro database 312 (e.g., EC2 or another AWS-specific data store) for execution by application controller 315 to launch an application for a network function. Application controller 315 can apply application state to the infrastructure provisioned by infrastructure controller 313. Application controller reads network data and infrastructure data from macro database 312 to create applications that support the templated network function. In the Kubernetes example, application controller 315 can deploy applications into the Kubernetes clusters of the cloud environment running macro controller 310 (AWS in the present example). Application data is written to macro database 312 using macro API 311 or by directly interfacing with macro database 312. Once the application is launched, the network function is instantiated and running in the targeted data center of the cloud environment (AWS in this example).

Global controller 302 can also launch network functions in data centers of other cloud environments. For example, global controller 302 can write jobs for execution by macro controller 320 in the Azure cloud environment. Macro controller 320 issues commands and interacts with other controllers in its environment (the Azure cloud in this example) using API calls or other communication techniques specific to the cloud environment or to the implemented container technology. In the present example, the controllers in the Azure cloud can use Azure commands and Kubernetes commands to provision a network function.

In various embodiments, global controller 302 can interface with macro controller 320 using an API and/or by writing stateful data to global database 304. Global database 304 can contain tasks for execution in the Azure cloud environment by macro controller 320 to create network functions in the Azure cloud environment. Macro controller 320 reads an input template to identify the network space parameters for network controller 324, infrastructure parameters for infrastructure controller 323, and application parameters for application controller 325 to implement a network function in the Azure environment. Macro controller 320 then writes jobs to implement the templated parameters to macro database 322 using macro API 321, for example. Network controller 324, infrastructure controller 323, and application controller 325 can sequentially perform jobs written to macro database 322 as described above in the AWS example. Network controller 324, infrastructure controller 323, and application controller 325 are each specific to their cloud environment (Azure in this example) and use Azure-based commands to provision the network function.

In various embodiments, global controller 302 can also interface with macro controller 330 using an API and/or by writing stateful data to global database 304. Global database 304 can contain tasks for execution in the GCP cloud environment by macro controller 330 to create network functions in the Azure cloud environment. Macro controller 330 reads an input template to identify the network space parameters for network controller 334, infrastructure parameters for infrastructure controller 333, and application parameters for application controller 335 to implement the network function in the GCP environment. Macro controller 330 can write jobs to implement the templated parameters to macro database 332 using macro API 331, for example. Network controller 334, infrastructure controller 333, and application controller 335 can sequentially perform jobs written to macro database 332 as described above in the AWS and Azure examples. Network controller 324, infrastructure controller 323, and application controller 325 are each specific to their cloud environment (GCP in this example). Network controller 334, infrastructure controller 333, and application controller 335 are each specific to their cloud environment (Azure in this example) and use Azure-based commands to provision the network function.

Each macro controller 310, 320, 330 may be adapted to the cloud environment which it manages, or in which it runs, and the templates implemented by the corresponding macro controller can be generic. In that regard, a single network function may have a generic template for each compatible cloud environment with platform-specific interpretations and implementations. For example, the AWS environment may have macro controller 310 that processes a generic template for implementation in AWS to implement a network function in the AWS environment using AWS-specific libraries. Continuing the example, the Azure environment may have macro controller 320 that processes a generic template for implementation in Azure to implement the network function in the Azure environment using Azure-specific libraries. Further continuing the example, the GCP environment may have its own macro controller 330 that processes a generic template for implementation in GCP to implement the same network function in the GCP environment using GCP-specific libraries. Any number of macro controllers can be implemented to manage container-based network functions in different cloud environments by interpreting generic templates to implement platform-specific infrastructure.

System 300 of FIG. 3 can use templates to commission virtualized network functions along with data to control state, which can be modified directly at a microlevel. The ease of modification or update enables the system to quickly adopt changes without reprocessing the entire stack. Template or state data can be changed at global controller 302 or at macro controllers 310, 320, 330 and quickly incorporated into system 300. Old versions of templates can be retained to facilitate backwards compatibility.

Figure 4:
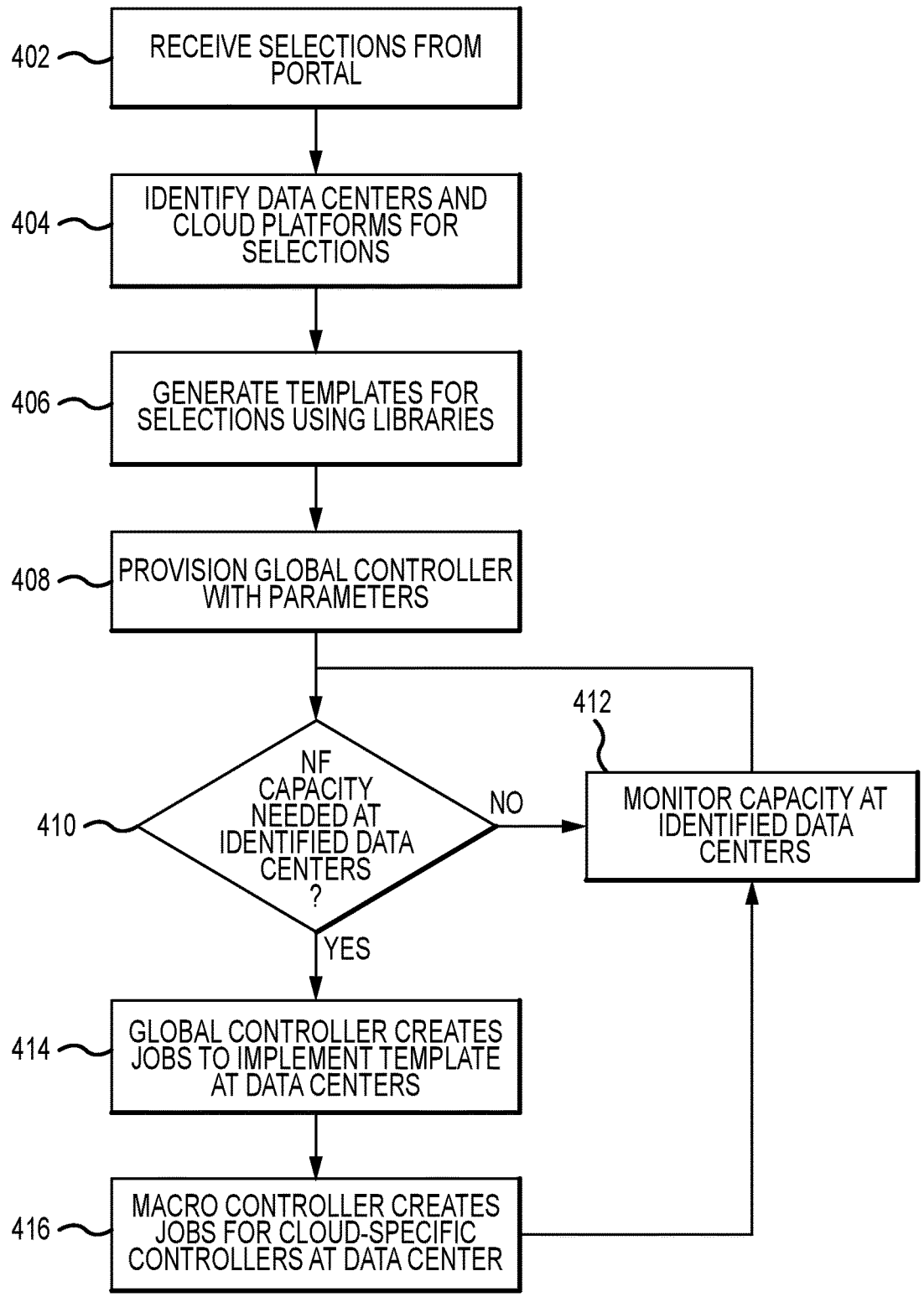
FIG. 4 illustrates an example process for configuring network functions in multi-cloud environments, in accordance with various embodiments.

Referring now to FIG. 4, an example process 400 for deploying system 300 of FIG. 3 is shown, in accordance with various embodiments. Process 400 can implement a top-down flow to support different implementations for guest networks 102, 103, 104 of FIG. 1 (e.g., MVNOs). The host operator can receive selections from a portal (Block 402). A portal can be presented to the MVNO to configure its network using a web interface, an application, or other suitable interfacing techniques. The guest operator can select geographic locations, network configurations, hardware configurations, virtualization capacity, messaging support, RAN type, or other configuration selections. For example, A MVNO can use a web portal to choose Nokia® network core, Mavenir® messaging, and Samsung® RAN for deployment in Chicago, Detroit, and Columbus. The MVNO can select settings through pick list with options.

The host operator can identify data centers and cloud platforms for the selections (Block 404). Closer data centers tend to support better speeds and reliability in network 100. Identification of data centers or cloud environments can be performed using a hard coded list, lookup tables, database tables, speed tests, performance monitoring, or other selection techniques suitable for identifying data centers. Continuing the above example, the selected cities (Chicago, Detroit, and Columbus) can have data centers located in or near them running the AWS and GCP cloud environments. The portal would thus identify the nearby data centers and the cloud platforms for AWS and GCP.

The portal may generate templates to implement network functions on the identified cloud environments (Block 406). Top level templates make reference to lower-level templates that will be used in the specific data centers to implement network functions. Continuing the above example, the selected Samsung® RAN can include configurable CU and DU images along with connectivity requirements. The portal can generate templates to implement the CU and DU images in both AWS and GCP, since those were the cloud environments selected based on nearby data centers. Infrastructure (e.g., memory, processing, and storage list), container images (e.g., applications to run on the infrastructure), and network space configurations (e.g., internet protocol configurations to support the applications and infrastructure) are identified using platform-specific commands, calls, or other implements. For example, the CU templates can include network provisioning for two/24 CIDR IP address ranges and two/28 IP ranges. Network controllers for the selected cloud platforms can ingest the templates and generate the requested IP resources using native infrastructure and commands to the particular platforms using the platform-specific data contained in the templates. The portal can include platform-specific libraries useable to generate the platform-specific templates.

Process 400 may provision global controller 302 of FIG. 3 with a parameter set (Block 408). Global controller 302 can enumerate parameters and identify relevant templates for ingestion and processing. Identified templates can be passed to macro controllers 310, 320, 330. The process is recursive in that the parameter sets passed to the platform-specific controllers can be interpreted, templates can be pulled, and templates then can be passed to the implementation controllers. Implementation controllers then in turn perform the same steps until implementing the actual resource in the particular cloud environment.

In various embodiments, global controller 302 may be configured with criteria for launching additional virtualized resources at the selected data centers (Block 410). For example, global controller 302 can check whether a predetermined amount of network function capacity is available at each of the data centers identified in block 404. If the data centers have sufficient capacity to support network functionality, global controller 302 may continue to monitor capacity at the data centers (Block 412).

If monitoring detects a lack of available network function capacity at a data center, global controller 302 may create jobs to implement templates at the identified data center (Block 414). Continuing the above example and with brief reference to FIG. 3, global controller 302 may write a job to global database 304 for execution in AWS by macro controller 310 (running in the AWS environment). The job may reference a template for use by macro controller 310 that is stored in macro database 312 or in global database 304.

The macro controller in a cloud environment creates jobs for cloud-specific controllers at the identified data center (Block 416). The jobs for cloud-specific controllers can be created by global controller 302 in response to the job for the global controller, the template identified as an input, and state data made available to global controller 302. For example, macro controller 310 in the AWS cloud environment provisions an instance of the network function by writing jobs for network controller 314, infrastructure controller 313, and application controller 315 to a task queue. Each of the controllers implement their portion of an scalable service unit (SSU) that will run the templated network function in the AWS environment by reading their job from macro database 312. To move work between clusters, the inbound request may be received as an API request or transaction, interpreted, and written into one or more task queues. The task queues may be read and tasks performed by an execution agent. The execution agent may be responsible for receiving parameters, understanding the parameters, creating work tasks to be executed by downstream processors, and then executing the request to the downstream processor by making an API call to that downstream processing controller API.

For example, global controller 302 may receive a request and interpret the request as an AWS platform request. Global controller 302 may schedule a job for macro controller 310 (e.g., the AWS platform controller) reflective of the interpretation. Macro controller 310 executes the job by making a call to the AWS platform-controller API. The AWS platform-controller API request is received at the platform-level controller, which interprets the request. The platform-level controller may then schedule one or more jobs to implement the API request in the AWS platform. Network controller 314, infrastructure controller 313, and application controller 315 may read the AWS platform-level jobs and execute.

Figure 5:
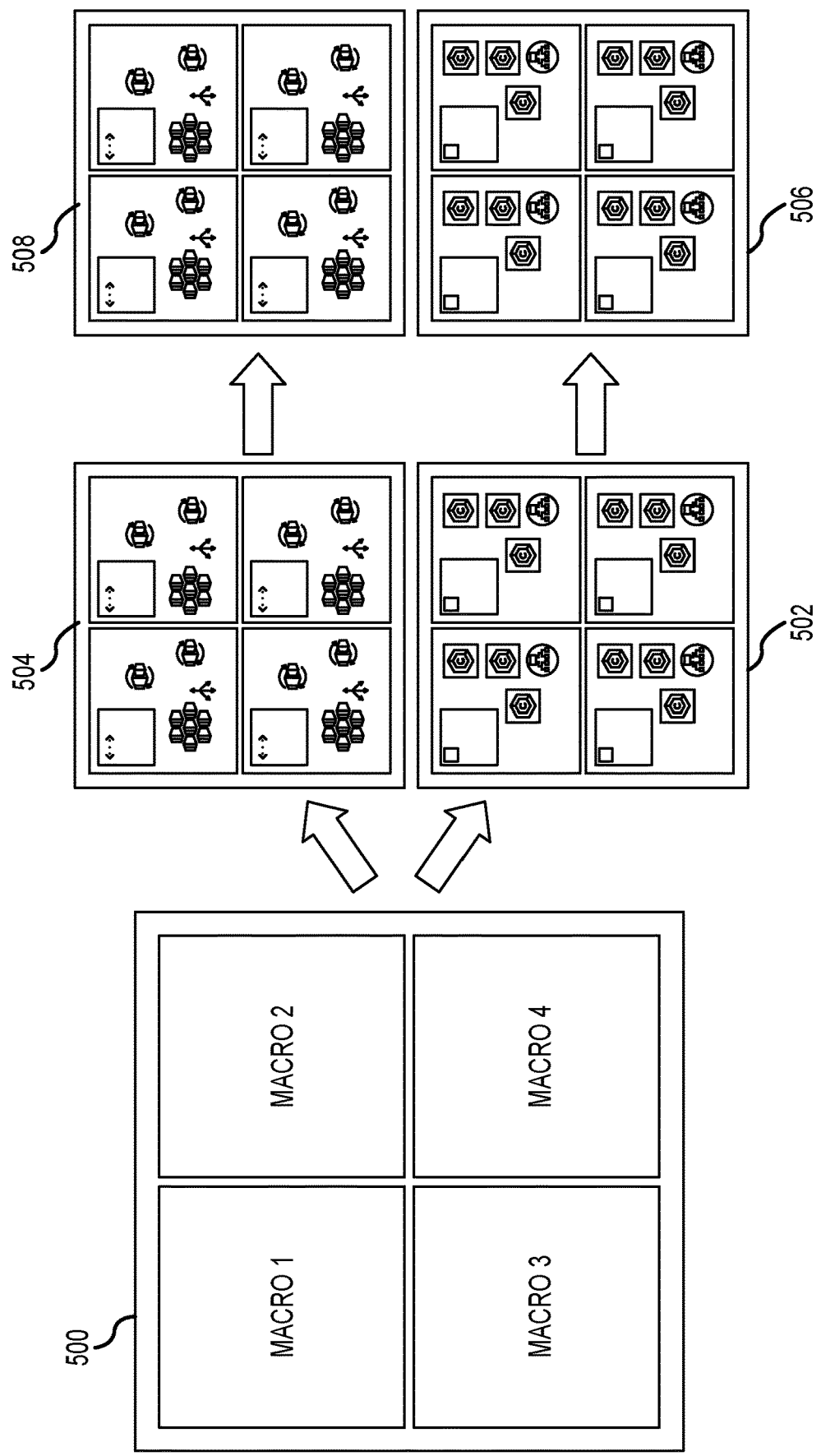
FIG. 5 illustrates an example template for instantiating network functions in multi-cloud environments, in accordance with various embodiments.

Referring now to FIG. 5, a visual representation of an example macropod 500 is shown, in accordance with various embodiments. Macropod 500 can be configured using templates that identify resources for allocation in a cloud environment to support a network function. The example of FIG. 5 depicts an AWS example, though templates are platform agnostic and can be implemented in other cloud environments. Templates may comprise high-level specifications for container clusters or pods. For example, the high-level specifications can include memory specifications, processing specifications, network specifications, security specifications, or other specifications to be satisfied by a cloud environment running a network function. Macropod 500 can contain one or more deployment descriptions (which are also macropods) that further contain details for network resources, infrastructure resources, and cloud-native network functions (CNF) deployment as an SSU. Templates can include specifications for multiple container clusters or pods to run network functions. In the example of FIG. 5, macropod 500 includes Macro 1, Macro 2, Macro 3, and Macro 4. A generic template in the example of FIG. 5 may be abstracted detail indicating to use macro 1, macro 2, macro 3, and macro 4 in the deployment pattern. Each macro may have its own detail on how to perform its specific deployments.

In various embodiments, global controller 302 can read a template and create jobs for macro controllers in cloud environments to implement the templated network functions. Macro controller 310 can execute jobs from global controller 302 using libraries agnostic to the cloud environment of macro controller 310 to implement template 502 on the targeted platform. In the examples of FIGS. 3 and 5, macro controller 310 can implement macropod 500 using a library to write jobs in the AWS cloud environment for network controller 314, infrastructure controller 313, and application controller 315 to macro database 312. Each of the controllers instantiates their portion of a container cluster that will run the templated network function in the AWS environment by reading and executing their jobs from macro database 312. Template 502 is not platform-specific to the cloud platform of macro controller 310. Composite structure 506 may be instantiated in AWS by macro controller 310 and platform-specific controllers (i.e., network controller 314, infrastructure controller 313, and application controller 315) and is a member of the high-level container cluster managed by global controller 302. In the present example, composite structure 506 represents four lower-level composite structures that can comprise, for example, a subnet, a Kubernetes cluster or cluster nodes, a load balancer, and CNF containers.

In some embodiments, the lowest layer implementing the cloud-specific infrastructure is configured to work in its native cloud environment, and higher layers are platform agnostic. Platform agnostic templates tend to support cross-platform compatibility without specialized development for each platform. Within the cloud platforms (as reference architecture) some examples can deploy clusters close to the environment where they will be performing activities for efficiency purposes.

With continued reference to examples of FIGS. 3 and 5, macro controller 320 can implement macropod 500 using the same library to write jobs in the Azure cloud environment for network controller 324, infrastructure controller 323, and application controller 325 to macro database 322. Macro controller 320 can execute jobs from global controller 302 using libraries of macro controller 320 to implement template 504 in the targeted environment. Each of the controllers instantiates their portion of a container cluster that will run the templated network function in the Azure environment by reading and executing their jobs from macro database 322. Container clusters 508 instantiated in Azure by macro controller 320 and platform-specific controllers (i.e., network controller 324, infrastructure controller 323, and application controller 325) is a member of the high-level container cluster managed by global controller 302. The container cluster managed by global controller 302 thus spans into multiple cloud environments. AWS and Azure are the cloud environments referenced in the present example, though various embodiments are compatible with any cloud environment capable of running containerized applications.

Figure 6:
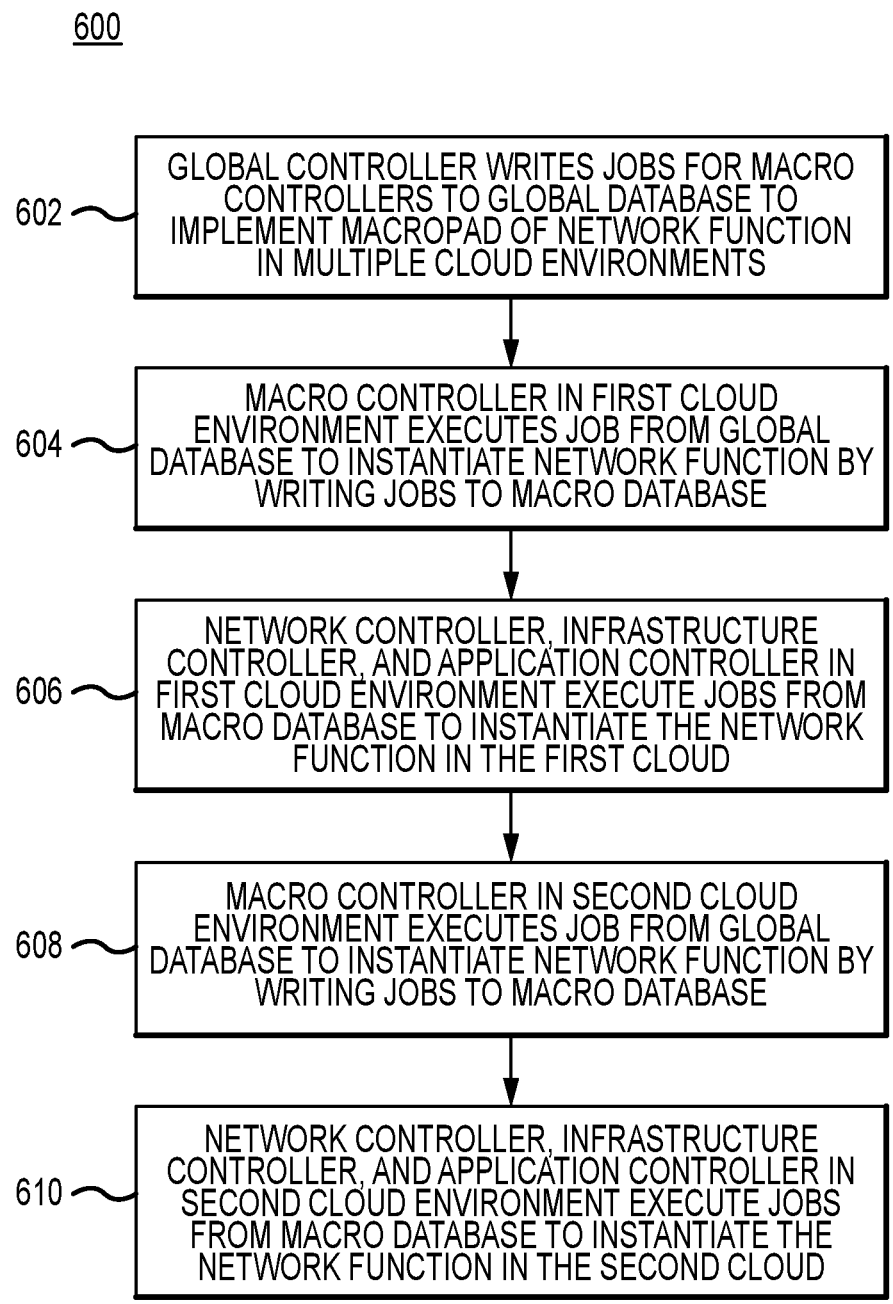
FIG. 6 illustrates an example process for instantiating network functions in multi-cloud environments, in accordance with various embodiments.

Referring now to FIG. 6, an example automated process 600 is shown for instantiating network functions in the same container cluster spanning multiple cloud environments. Process 600 can include writing, by global controller 302 in a first computing environment, a job to a global database 304 to implement a macropod 500 of a network function in multiple cloud environments (Block 602). Global controller 302 orchestrates a container cluster, and macro controllers 310, 320, 330 for each included cloud environment can be members of the container cluster. In some embodiments, the macro controller can reference targeted templates for each cloud environment, and in some embodiments, macro controllers 310, 320, 330 can generate templates 502, 504 for macropod 500.

Macro controllers can execute jobs from global database 304 in their respective cloud environments (Block 604, 608). Each macro controller 310, 320, 330 may orchestrate a container cluster in its respective cloud environment. The platform centric clusters can be members of the global container cluster orchestrated by global controller 302. To execute the jobs from the global database, macro controllers can write jobs to the macro database local to its cloud environment (Block 606, 610). For example, a macro controller can execute a global job by writing a job for a network controller to its macro database, writing a job for an infrastructure controller to its macro database, and writing a job for an application controller to the macro database in the first cloud environment. The network controller executes its job to allocate network resources in its cloud environment, the infrastructure controller executes its job to deploy the container infrastructure using the network resources in its cloud environment, and the application controller executes its job to instantiate the network function using the container infrastructure deployed by the infrastructure controller and using the network resources allocated by the network controller.

The recursive container orchestration of the present disclosure enables multi-platform provisioning of CORE and RAN network functions in multiple cloud environments. The platform-agnostic approach enables an ORAN network to run on multiple cloud platforms that use different supporting infrastructure by using abstracted templates that are independent of the underlying cloud platform. A wireless network provider using the System of the present disclosure can automate the provisioning, updating, destruction, and scaling of a telecommunications network on programmatically provisioned infrastructure through templated design and well-planned architectures. The distributed, multi-cloud automation platform tends to improve resilience and performance of the supported telecommunication network by enabling use of datacenters supporting distinct cloud environments.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process comprising:
    writing, by a global controller in a first computing environment, a first job and a second job to a global database to implement a template of a network function in a first cloud environment and a second cloud environment, wherein the global controller orchestrates a first container cluster, wherein the template comprises a memory specification, a processing specification, a network specification, and a security specification;
    executing, by a first macro controller in the first cloud environment, the first job from the global database to instantiate the network function in the first cloud environment, wherein the first macro controller orchestrates a second container cluster that is a member of the first container cluster;
    executing, by a second macro controller in the second cloud environment, the second job from the global database to instantiate the network function in the second cloud environment, wherein the second macro controller orchestrates a third container cluster that is a member of the first container cluster; and
    generating, by the first macro controller, a targeted template using a library specific to the first cloud environment, wherein the targeted template implements the memory specification, the processing specification, the network specification, and the security specification using commands native to the first cloud environment.

2. The automated process of claim 1, wherein executing the first job comprises:
    writing, by the first macro controller, a third job for a network controller to a macro database in the first cloud environment;
    writing, by the first macro controller, a fourth job for an infrastructure controller to the macro database in the first cloud environment; and
    writing, by the first macro controller, a fifth job for an application controller to the macro database in the first cloud environment.

3. The automated process of claim 2, further comprising executing, by the network controller, the third job to allocate network resources in the first cloud environment.

4. The automated process of claim 3, further comprising executing, by the infrastructure controller, the fourth job to deploy the second container cluster using the network resources.

5. The automated process of claim 4, further comprising executing, by the application controller, the fifth job to instantiate the network function on the second container cluster using the network resources.

6. The automated process of claim 2, wherein executing the second job comprises:
    writing, by the second macro controller, a sixth job for a second network controller to a second macro database in the second cloud environment;
    writing, by the second macro controller, a seventh job for a second infrastructure controller to the second macro database in the second cloud environment; and
    writing, by the second macro controller, an eighth job for a second application controller to the second macro database in the second cloud environment.

7. The automated process of claim 1, further comprising:
    receiving, from a portal, a selected configuration for a guest network; and
    generating, by the portal, the template of the network function to implement the selected configuration.

8. The automated process of claim 7, further comprising identifying a first data center of the first cloud environment to host the network function in response to a geographic location of the selected configuration.

9. A multi-cloud platform that implements a network function of a telecommunication network, the multi-cloud platform comprising a processor in communication with a non-transitory memory configured to store instructions that, when executed by the processor, cause the multi-cloud platform to perform operations, the operations comprising:

writing, by a global controller in a first computing environment, a first job and a second job to a global database to implement a template of the network function in a first cloud environment and a second cloud environment, wherein the global controller orchestrates a first container cluster, wherein the template comprises a memory specification, a processing specification, a network specification, and a security specification;

executing, by a first macro controller in the first cloud environment, the first job from the global database to instantiate the network function in the first cloud environment, wherein the first macro controller orchestrates a second container cluster that is a member of the first container cluster;

executing, by a second macro controller in the second cloud environment, the second job from the global database to instantiate the network function in the second cloud environment, wherein the second macro controller orchestrates a third container cluster that is a member of the first container cluster; and generating, by the first macro controller, a targeted template using a library specific to the first cloud environment, wherein the targeted template implements the memory specification, the processing specification, the network specification, and the security specification using commands native to the first cloud environment.

10. The multi-cloud platform of claim 9, wherein executing the first job comprises:
   writing, by the first macro controller, a third job for a network controller to a macro database in the first cloud environment;
   writing, by the first macro controller, a fourth job for an infrastructure controller to the macro database in the first cloud environment; and
   writing, by the first macro controller, a fifth job for an application controller to the macro database in the first cloud environment.

11. The multi-cloud platform of claim 10, wherein the operations further comprise executing, by the network controller, the third job to allocate network resources in the first cloud environment.

12. The multi-cloud platform of claim 11, wherein the operations further comprise executing, by the infrastructure controller, the fourth job to deploy the second container cluster using the network resources.

13. The multi-cloud platform of claim 12, wherein the operations further comprise executing, by the application controller, the fifth job to instantiate the network function on the second container cluster using the network resources.

14. The multi-cloud platform of claim 10, wherein executing the second job comprises:
   writing, by the second macro controller, a sixth job for a second network controller to a second macro database in the second cloud environment;
   writing, by the second macro controller, a seventh job for a second infrastructure controller to the second macro database in the second cloud environment; and
   writing, by the second macro controller, an eighth job for a second application controller to the second macro database in the second cloud environment.

15. A non-transitory computer-readable medium having instructions stored thereon that, when executed by a computer-based system, cause the computer- based system to perform operations, the operations comprising:
   writing, by a global controller in a first computing environment, a first job and a second job to a global database to implement a template of the network function in a first cloud environment and a second cloud environment, wherein the global controller orchestrates a first container cluster, wherein the template comprises a memory specification, a processing specification, a network specification, and a security specification;
   executing, by a first macro controller in the first cloud environment, the first job from the global database to instantiate the network function in the first cloud environment, wherein the first macro controller orchestrates a second container cluster that is a member of the first container cluster;
   executing, by a second macro controller in the second cloud environment, the second job from the global database to instantiate the network function in the second cloud environment, wherein the second macro controller orchestrates a third container cluster that is a member of the first container cluster; and
   generating, by the first macro controller, a targeted template using a library specific to the first cloud environment, wherein the targeted template implements the memory specification, the processing specification, the network specification, and the security specification using commands native to the first cloud environment.

16. The non-transitory computer-readable medium of claim 15, wherein executing the first job comprises:
   writing, by the first macro controller, a third job for a network controller to a macro database in the first cloud environment;
   writing, by the first macro controller, a fourth job for an infrastructure controller to the macro database in the first cloud environment; and
   writing, by the first macro controller, a fifth job for an application controller to the macro database in the first cloud environment.

17. The non-transitory computer-readable medium of claim 16, wherein the operations further comprise:
   executing, by the network controller, the third job to allocate network resources in the first cloud environment;
   executing, by the infrastructure controller, the fourth job to deploy the second container cluster using the network resources; and
   executing, by the application controller, the fifth job to instantiate the network function on the second container cluster using the network resources.

* * * * *